(12) United States Patent
Wang et al.

(10) Patent No.: US 8,619,582 B2
(45) Date of Patent: Dec. 31, 2013

(54) DATA PROCESSING METHODS FOR PROCESSING MACHINE TYPE COMMUNICATION DATA AND WIRELESS COMMUNICATIONS SYSTEMS THEREOF

(75) Inventors: Guotong Wang, Beijing (CN); Anthony Lee, San Diego, CA (US)

(73) Assignee: Via Telecom Co., Ltd., George Town, Grand Cayman (KY)

( * ) Notice: Subject to any disclaimer, the term of this patent is extended or adjusted under 35 U.S.C. 154(b) by 125 days.

(21) Appl. No.: 13/209,140

(22) Filed: Aug. 12, 2011

(65) Prior Publication Data

US 2012/0039253 A1  Feb. 16, 2012

Related U.S. Application Data

(60) Provisional application No. 61/373,153, filed on Aug. 12, 2010.

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)

(52) U.S. Cl.
USPC ........... 370/236; 370/401; 370/537; 370/539; 370/541

(58) Field of Classification Search
USPC ......... 370/230, 231, 232, 235, 236, 237, 401, 370/537, 539, 541, 328
See application file for complete search history.

(56) References Cited

U.S. PATENT DOCUMENTS

| 2009/0262683 A1* | 10/2009 | Khetawat et al. | 370/328 |
| 2011/0264740 A1* | 10/2011 | Diachina et al. | 709/204 |
| 2012/0016942 A1* | 1/2012 | Cherian et al. | 709/206 |
| 2012/0039253 A1* | 2/2012 | Wang et al. | 370/328 |
| 2012/0047551 A1* | 2/2012 | Pattar et al. | 726/1 |

* cited by examiner

*Primary Examiner* — Benjamin H Elliott, IV
(74) *Attorney, Agent, or Firm* — McClure, Qualey & Rodack, LLP

(57) ABSTRACT

A data processing method for a wireless communication system with a plurality of terminals, an intermediate device and a service network, the method comprising: sending a plurality of machine type communication (MTC) data flows from the plurality of terminals to the intermediate device; performing a data multiplexing operation by the intermediate device on the plurality of machine type communication data flows to generate a multiplexed data flow; and the service network receiving the multiplexed data flow.

20 Claims, 9 Drawing Sheets

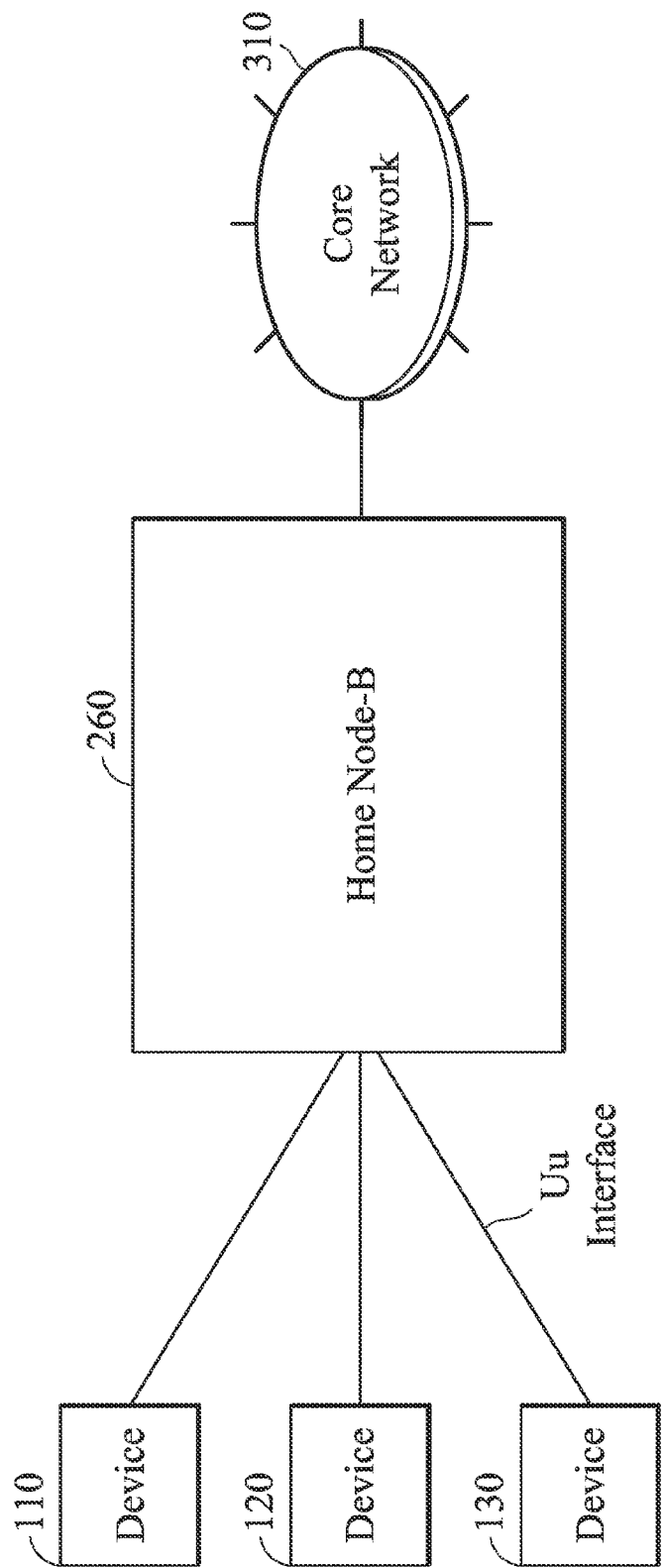

DATA PROCESSING METHODS FOR PROCESSING MACHINE TYPE COMMUNICATION DATA AND WIRELESS COMMUNICATIONS SYSTEMS THEREOF

CROSS REFERENCE TO RELATED APPLICATIONS

This application claims priority of U.S. Provisional Application No. 61/373,153, filed on Aug. 12, 2010, and the entirety of which is incorporated by reference herein.

BACKGROUND OF THE INVENTION

1. Field of the Invention

The invention generally relates to mobile communication technologies, and more particularly, to wireless communication systems for performing machine type communication data transmissions using a gateway and a relay node and related data processing methods.

2. Description of the Related Art

In a typical mobile communication environment, a user equipment (UE) may communicate voice and/or data signals with one or more service networks via cellular stations (or referred to as evolved Node-Bs (eNBs)) of service networks. The wireless communications between the UE and the service networks may be in compliance with various wireless technologies, such as the Global System for Mobile communications (GSM) technology, General Packet Radio Service (GPRS) technology, an enhanced Data rates for Global Evolution (EDGE) technology, Wideband Code Division Multiple Access (WCDMA) technology, Code Division Multiple Access 2000 (CDMA 2000) technology, Time Division-Synchronous Code Division Multiple Access (TD-SCDMA) technology, Worldwide Interoperability for Microwave Access (WiMAX) technology, Long Term Evolution (LTE) technology, and others. Particularly, in a service network in compliance with the WCDMA or LTE technology, a special cellular station, called a Home Node-B (HNB), or Home e-Node-B (HeNB) is used, which is typically designed to improve wireless reception quality of service networks for indoor coverage, such as in a home or in a small business space.

Moreover, in current LTE wireless communication systems, in addition to normal human-to-human (H2H) communications, machine type communications (MTC) are also provided. MTC is Machine-to-Machine communications, which is also referred to as the Internet of Things (TOT), of which the main concept is to connect real world objects to the Internet via the embedded short range mobile transceiver using radio-frequency identification (RFID) for automatic recognition and information interconnection and sharing for all of the objects.

When MTC is deployed by the service network, a lot of MTC applications can be used indoors, such as for automatic metering, automatic monitoring, etc. These applications can be applied to the cellular service networks, such as the LTE, the GSM, or the CDMA network. Alternatively, data needed for the MTC applications can also be transmitted via short distance wireless technologies, such as Bluetooth, Zigbee, WiFi, and infrared wireless technologies, and so on. In addition, when the MTC is deployed outdoors, such as in rural areas, the uplink coverage for each MTC device may be limited since most MTC device has low radio frequency (RF) capabilities. To improve uplink coverage, one node of a wireless communication system may utilize one or more relay nodes to communicate with another node of the wireless communication system. The uplink coverage can be extended through the relay nodes. In current relay node deployment, however, each MTC device that is coupled to a relay node has to maintain a responsive connection on the interface between the MTC device and the relay node to transmit required data to the service network through the relay node. For example, if there are three MTC devices attempting to transmit MTC data, three responsive connections should be maintained over the interface between the MTC devices and the relay node. As the amount of MTC devices increases, the signaling load over the interface also increases.

So there needs a method to prevent the air interface from being blocked up in the art.

BRIEF SUMMARY OF THE INVENTION

Accordingly, embodiments of the invention provide data processing methods for processing machine type communication (MTC) data and related wireless communication systems. In one aspect of the invention, a data processing method for a wireless communication system with a plurality of terminals, an intermediate device and a service network, the method comprising: sending a plurality of machine type communication data flows from the plurality of terminals to the intermediate device; performing a data multiplexing operation by the intermediate device on the plurality of machine type communication data flows to generate a multiplexed data flow; and receiving the multiplexed data flow by the service network.

In one aspect of the invention, a wireless communication system comprises a plurality of terminals, for sending a plurality of machine type communication data flows; an intermediate device, coupled to the plurality of device, for receiving the plurality of machine type communication data flows, performing a data multiplexing operation on the plurality of machine type communication data flows to generate a multiplexed data flow; and a service network coupled to the intermediate device for receiving the multiplexed data flow.

In another aspect of the invention, a data processing apparatus for performing data transmission in a wireless communication system, the data processing apparatus comprising: a receiving module, for receiving a first data flows, wherein the first data flows comprising a plurality of machine type communications data flows; a data multiplexing module, for performing a data multiplexing operation on the plurality of machine type communication data flows received by the receiving module to generate a multiplexed data flow; and a transmitting module, for transmitting a second data flows, wherein the second data flows comprising the multiplexed data flow.

Other aspects and features of the invention will become apparent to those with ordinary skill in the art upon review of the following descriptions of specific embodiments of the wireless communication systems and the data processing methods.

BRIEF DESCRIPTION OF DRAWINGS

The invention can be more fully understood by reading the subsequent detailed description and examples with references made to the accompanying drawings, wherein:

FIG. 9 is a schematic diagram illustrating another wireless communication system that includes an enhanced Home Node-B with the gateway function according to another embodiment of the invention.

DETAILED DESCRIPTION OF THE INVENTION

The following description is of the best-contemplated mode of carrying out the invention. This description is made for the purpose of illustrating the general principles of the invention and should not be taken in a limiting sense.

The invention provides an MTC gateway or related gateway module acting as an aggregator node and/or a proxy to prevent cellular air interface from congesting, wherein the MTC gateway may connect the underlying MTC devices either through the aforementioned RATs, such as the CDMA2000/GSM/UMTS/LTE technology or through other communication means and apparatuses. In addition, the MTC gateway can perform several functions, such as data forwarding, data aggregation, admission control, protocol translation, device monitoring and so on. The MTC gateway may connect to the service network with cellular radio access technologies, such as CDMA2000/GSM/UMTS/LTE. Therefore, the MTC traffic data can be transmitted over the cellular radio access networks.

Figure 1:
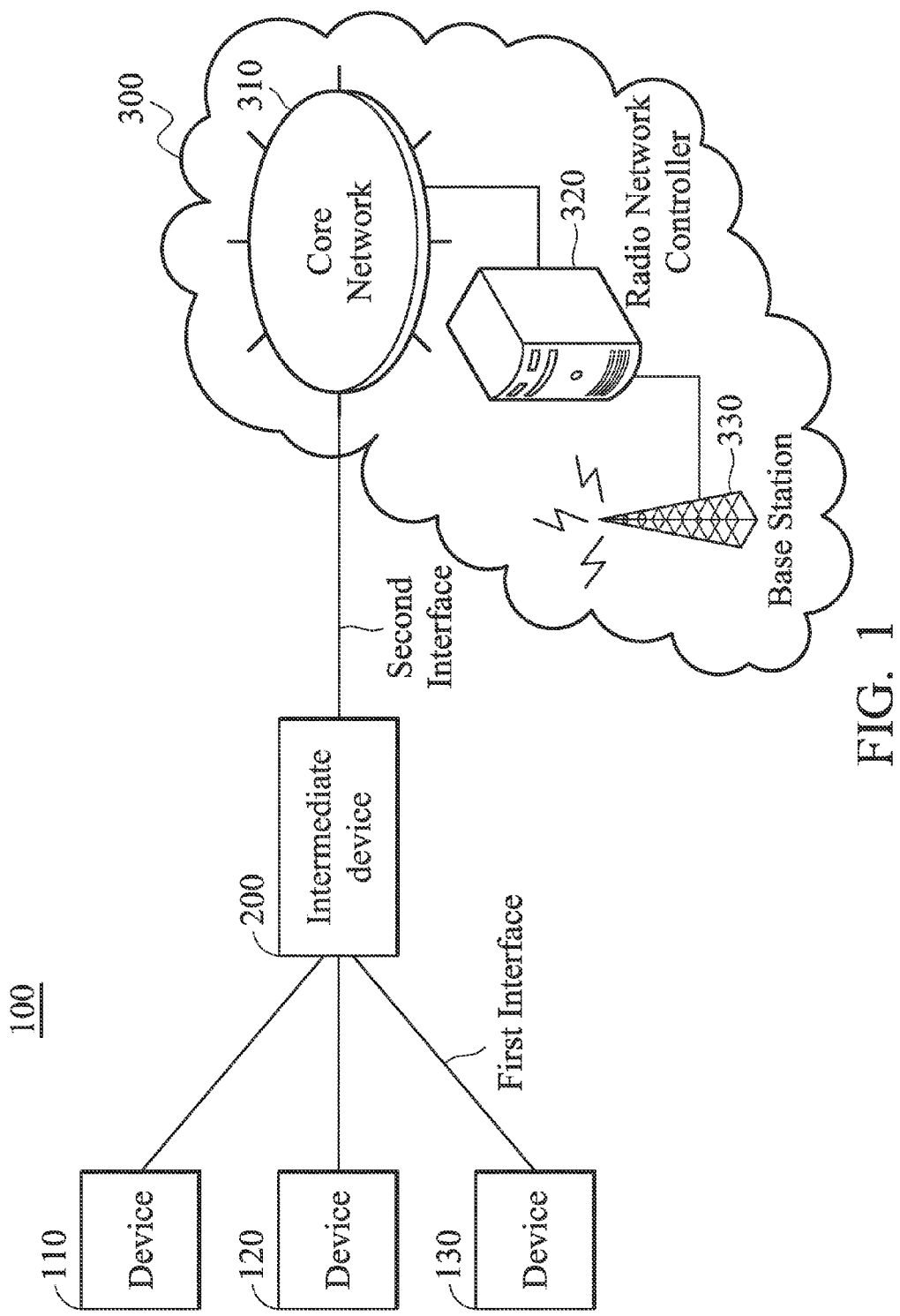
FIG. 1 is a block diagram illustrating a wireless communication system according to an embodiment of the invention.

FIG. 1 is a block diagram illustrating a wireless communication system according to an embodiment of the invention. As shown in FIG. 1, the wireless communication system 100 at least comprises multiple devices 110, 120 and 130, an intermediate device 200 and a service network 300. In some embodiments, the devices used hereinafter can also be referred to as terminals. In the wireless communication system 100, the plurality of devices 110, 120 and 130 are wirelessly connected to the cellular station (i.e., base station) 330 of the service network 300 for obtaining wireless services. The intermediate device 200 is coupled to the plurality of devices 110, 120 and 130 through a first interface and is coupled to the service network 300 through a second interface. Note that the first interface may be in compliance with a first RAT, such as a short range communication related RAT, e.g. Bluetooth, Zigbee, WiFi, infrared and so on, while the second interface may be in compliance with a cellular service network related RAT, e.g. LTE, LTE-Advanced, CDMA2000 and others RATs. The service network 300 may comprise a core network (CN) 310, a radio network controller (RNC) 320 and one or more base stations 330. Each base station 330 may provide mobile network services to the users or devices within the scope of its signal coverage. Generally, each of the plurality of devices 110, 120 and 130 may be referred to as a User Equipment (UE) and the base station 330 may be referred to as a cellular station, an access station or an evolved Node B (eNB). In this embodiment, each of the plurality of devices 110, 120 and 130 may be an MTC capable device which is a device supporting MTC operations and can be used to perform machine to machine (M2M) communications with other MTC capable devices or systems. Each device may further comprise a wireless module (not shown) for performing the functionality of wireless transmissions and receptions to and from the base station 330. To further clarify, the wireless module may comprise a baseband unit (not shown) and a radio frequency (RF) unit (not shown). The baseband unit may contain multiple hardware devices to perform baseband signal processing, including analog to digital conversion (ADC)/digital to analog conversion (DAC), gain adjusting, modulation/demodulation, encoding/decoding, and so on. The RF unit may receive RF wireless signals, convert the received RF wireless signals to baseband signals, which are processed by the baseband unit, or receive baseband signals from the baseband unit and convert the received baseband signals to RF wireless signals, which are later transmitted. The RF unit may also contain multiple hardware devices to perform radio frequency conversion. For example, the RF unit may comprise a mixer to multiply the baseband signals with a carrier oscillated in the radio frequency of the mobile communications system, wherein the radio frequency may be 900 MHz, 1900 MHz, or 2100 MHz utilized in WCDMA systems, or may be 900 MHz, 2100 MHz, or 2.6 GHz utilized in LTE systems, or others depending on the radio access technology (RAT) in use. Also, each device further comprises a controller module (not shown) for controlling the operation of the wireless module and other functional components, such as a display unit and/or a keypad serving as the MMI (man-machine interface), a storage unit storing the program codes of applications or communication protocols, or others.

Figure 2:
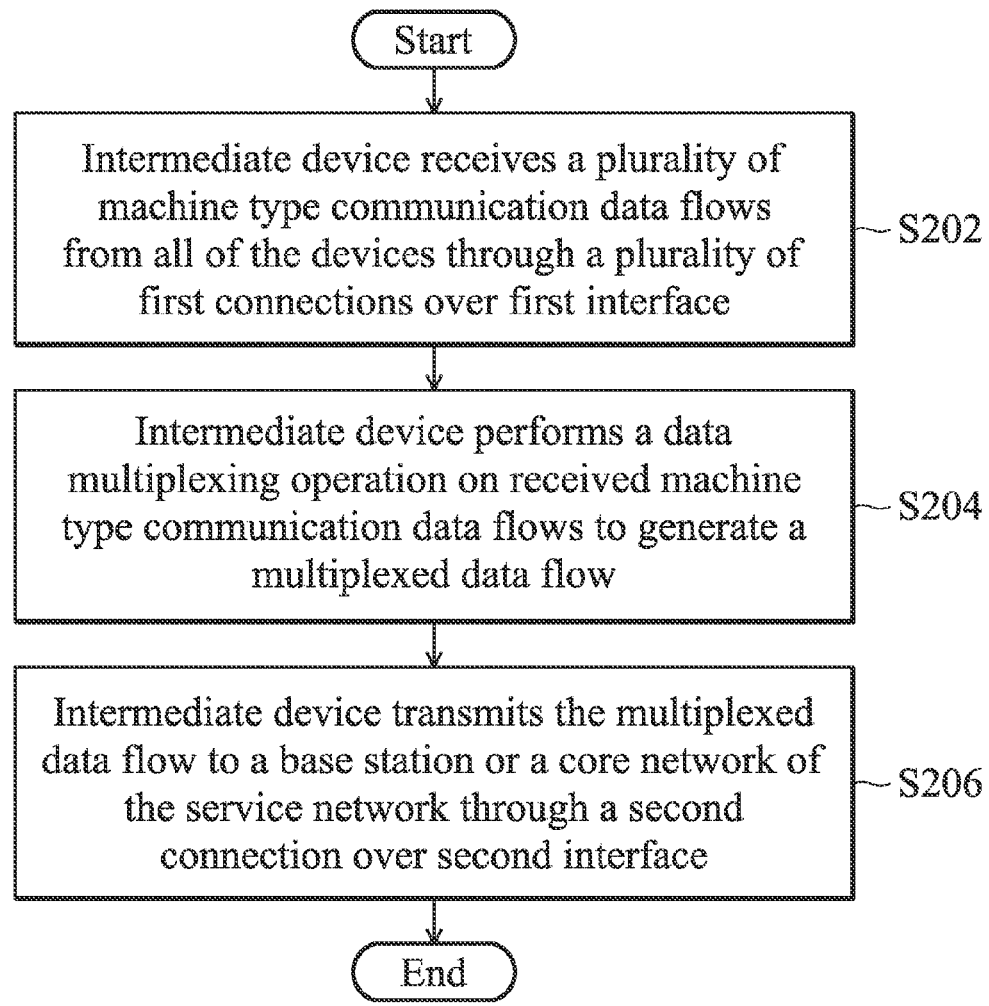
FIG. 2 is a flow chart illustrating a data processing method for processing MTC data according to an embodiment of the invention.

FIG. 2 is a flow chart illustrating a data processing method for processing MTC data according to an embodiment of the invention. In this embodiment, the data processing method for processing MTC data may be applied in the wireless communication system 100 as shown in FIG. 1, wherein the intermediate device 200 is connected to the plurality of devices 110, 120 and 130 through a first interface. When the plurality of devices 110, 120 and 130 attempt to perform MTC data transmission, each device may first establish a responsive first connection with the intermediate device 200 and then transmit one MTC data flow to the intermediate device 120 through the responsive first connection over the first interface. First, in step S202, the intermediate device 200 respectively receives a plurality of MTC data flows from all of the plurality of devices 110, 120 and 130 through a plurality of first connections over the first interface. Note that the first interface may be any interface in compliance with a short range communication related RAT, e.g. a Bluetooth interface, and the second interface may be an interface in compliance with a cellular service network related RAT, e.g. an LTE based interface supporting the LTE RAT. Therefore, the intermediate device 200 may respectively receive a plurality of MTC data flows from all of the plurality of devices 110, 120 and 130 through a plurality of first connections over the Bluetooth interface using the Bluetooth wireless technology. In step S204, after all of the MTC data flows have been received from the plurality of devices 110, 120 and 130, the intermediate device 200 performs a data multiplexing operation on received MTC data flows to generate a multiplexed data flow and then in step S206, transmits the multiplexed data flow to a base station or a core network of the service network 300 through a second connection over the second interface. For example, the second interface may be an interface in compliance with a second RAT, e.g. an LTE based interface supporting the LTE RAT, and the intermediate device 120 may perform a data multiplexing operation on received MTC data flows to convert the MTC data flows which are in compliance with the first RAT (e.g. Bluetooth technology) into a single multiplexed data flow that is in compliance with the second RAT (e.g. LTE technology) and then transmit the single multiplexed data flow to the base station 330 or the core network 310 of the service network 300 through the second connection over the second interface to perform an MTC operation.

Generally, the radio interface protocol for the LTE wireless communication system includes three layers: a Physical (PHY) Layer (or so-called L1 layer), a Data Link Layer (or so-called L2 layer) and a Network Layer (or so-called L3 layer). The Network Layer is a Radio Resource Control (RRC) layer in the control plane and the Data Link Layer is further divided into a Packet Data Convergence Protocol (PDCP) layer, a Radio Link Control (RLC) layer and a Media Access Control (MAC) layer.

Figure 3:
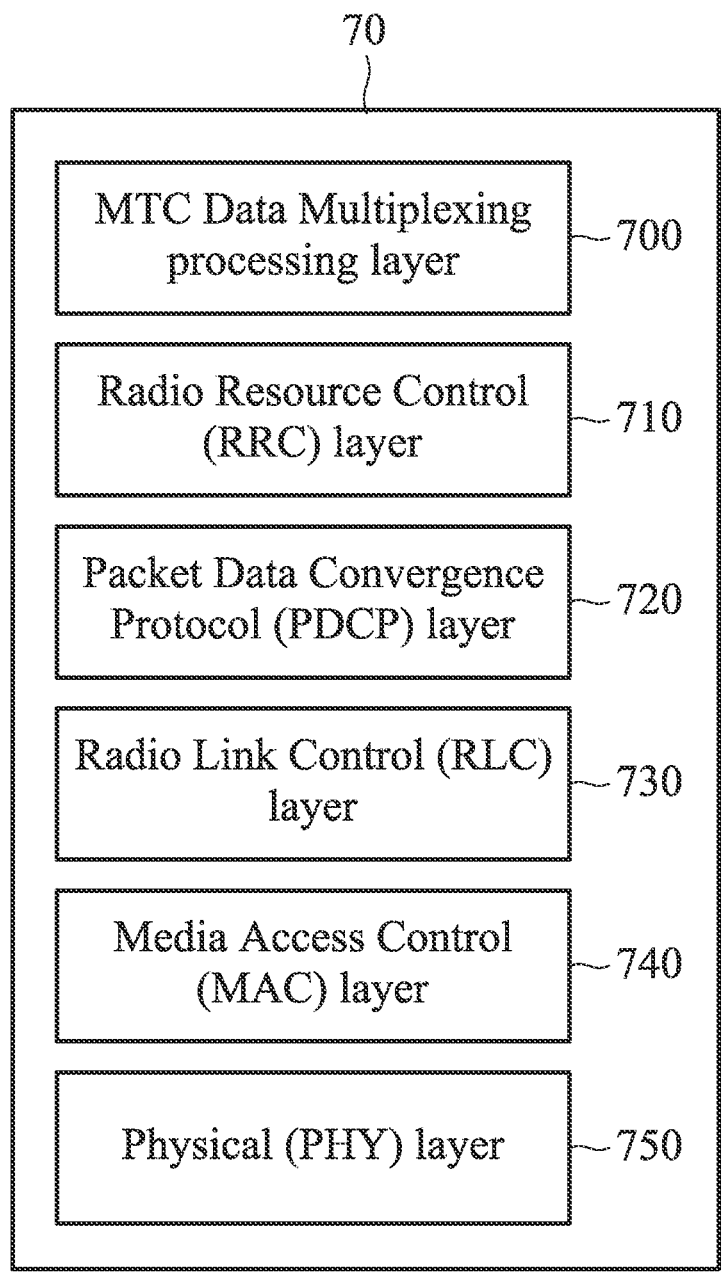
FIG. 3 is a schematic diagram illustrating an embodiment of communication protocol layer architecture according to the invention.

Please refer to FIG. 3. FIG. 3 is a schematic diagram illustrating an embodiment of communication protocol layer architecture 70 according to the invention. The communication protocol layer architecture 70 comprises a plurality of communication protocol layers, which comprise, from top to bottom, an MTC data multiplexing processing layer 700, a Radio Resource Control (RRC) layer 710, a Packet Data Convergence Protocol (PDCP) layer 720, a Radio Link Control (RLC) layer 730, a Media Access Control (MAC) layer 740 and a Physical (PHY) layer 750. The MTC data multiplexing processing layer 700 is a newly added communication protocol for converging the MTC data flows that are sent from each device and are processed via the RRC layer 710, the PDCP layer 720, the RLC layer 730, the MAC layer 740 and the PHY layer 750 into a single data flow. In some embodiments, the communication protocol layer architecture 70 shown in FIG. 3 can be applied to the relay node. In other embodiments, the communication protocol layer architecture 70 can also be applied to the gateway or the Home Node-B.

It is to be understood that the intermediate device 120 of the wireless communication system 100 may have various architecture deployments, such as the intermediate device 120 may include/exclude one of a gateway, a relay node and a Home Node-B or a combination thereof. Detailed descriptions regarding the number of architecture deployments and responsive data processing methods applied thereto are illustrated below with reference to FIGS. 4 to 9.

Figure 4:
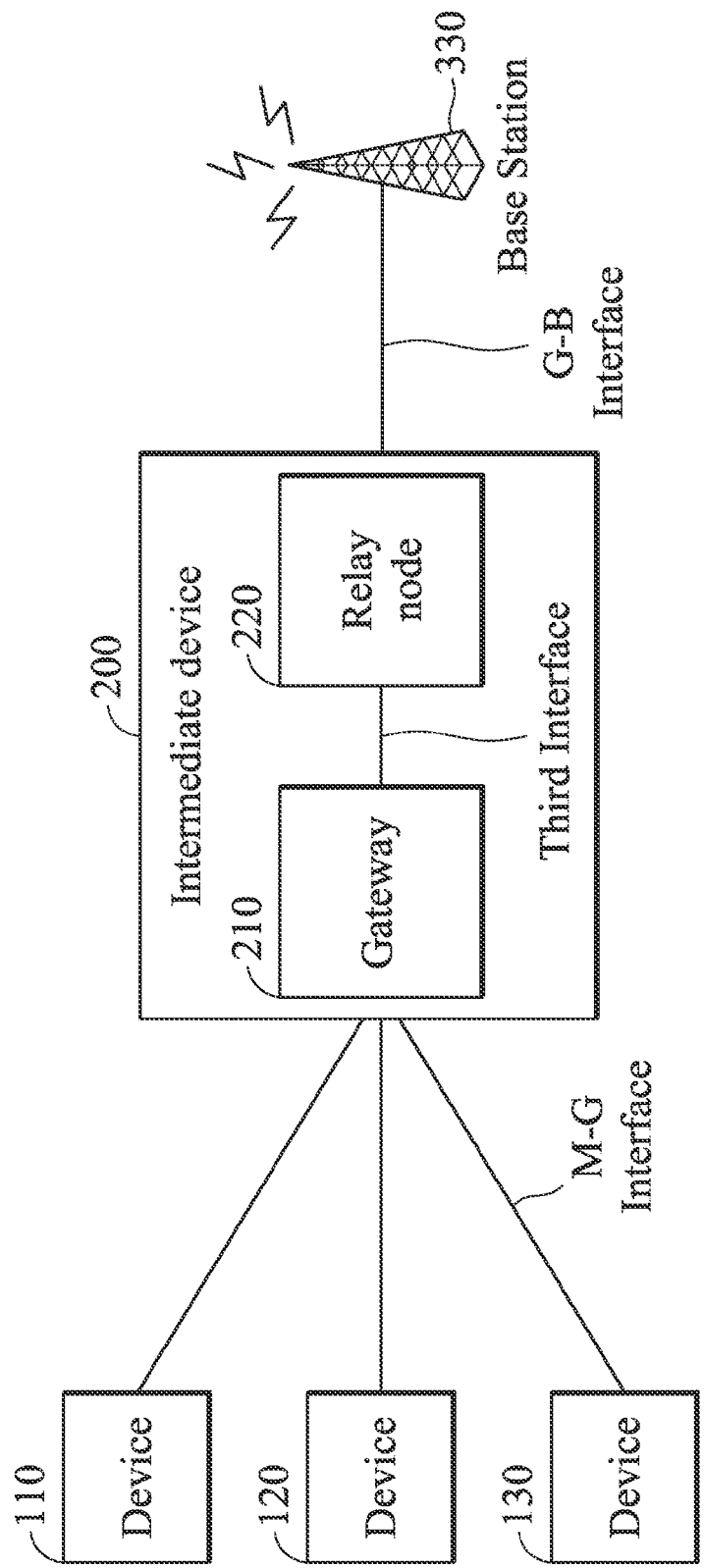
FIG. 4 is a schematic diagram illustrating another wireless communication system according to another embodiment of the invention.

In some embodiments, a relay node architecture which is deployed with the MTC gateway is provided. FIG. 4 is a block diagram illustrating another wireless communication system according to another embodiment of the invention. As shown in FIG. 4, the wireless communication system 100 comprises multiple MTC devices 110, 120 and 130, a gateway 210, a relay node 220 and a base station 330. Each of the MTC devices 110, 120 and 130 may communicate with the gateway 210 through an M-G interface. The gateway 210 may communicate with the relay node 220 through a dedicated interface (the third interface) configured therebetween. The relay node 220 may communicate with the base station 330 of the service network 300 through a G-B interface located therebetween. For example, the M-G interface between the MTC device 110 and the gateway 210 may be in compliance with various RATs, e.g. the cellular radio access technologies or other short range wireless techniques, such as Bluetooth, Zigbee, WiFi, infrared and so on. The gateway 210 may communicate with the relay node 220 through an internal interface therebetween. The gateway 210 may receive the multiple MTC data flows from the plurality of devices 110-130 via the first connections over the first interface and then generate the multiplexed data flow by performing the data multiplexing operation on the received MTC data flows. The G-B interface between the relay node 220 and the base station 330 may be in compliance with cellular radio technologies, such as LTE, LTE-Advanced or CDMA2000 cellular radio technologies. In this embodiment, the gateway 210 and the relay node 220 within the intermediate device 200 are integrated together, and the gateway 210 can receive the MTC data flows from the plurality of devices 110-130 via the first connections over the first interface (M-G interface) and perform the data multiplexing operation on the received MTC data flows to generate a single multiplexed data flow. Accordingly, the relay node 220 which is coupled to the gateway 210 through a third interface can receive the multiplexed data flow through the third interface and transmit the multiplexed data flow to the base station 330 of the service network 300 through a second connection over the second interface (G-B interface).

Figure 5:
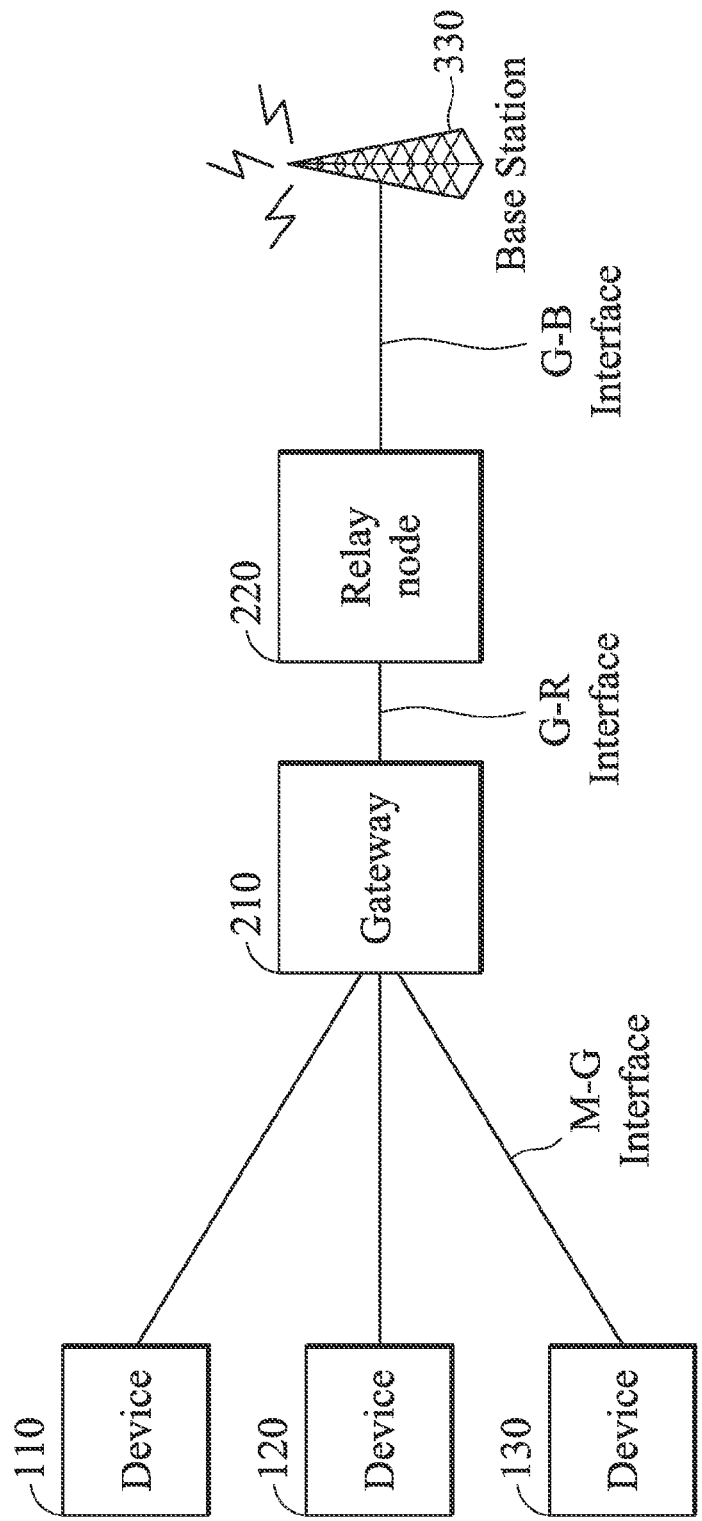
FIG. 5 is a schematic diagram illustrating another wireless communication system according to another embodiment of the invention.

In some embodiments, the gateway 210 and the relay node 220 can also be deployed separately, as shown in FIG. 5. FIG. 5 is a schematic diagram illustrating another wireless communication system according to another embodiment of the invention. As shown in FIG. 5, the gateway 210 and the relay node 220 are deployed separately between the plurality of devices 110, 120, 130 and the base station 330. Each of the MTC devices 110, 120 and 130 may communicate with the gateway 210 through an M-G interface. The gateway 210 may communicate with the relay node 220 through a G-R interface configured therebetween. The relay node 220 may communicate with the base station 330 through a G-B interface located therebetween. In this embodiment, the gateway 210 should use the RAT that is the same as that supported by the relay node 220. For example, if the LTE access technology is utilized by the relay node 220 for communications, the gateway 210 has to support the LTE wireless technology so as to be able to communicate with the relay node 220 and the G-R interface between the gateway 210 and the relay node 220 must be an LTE radio interface which is in compliance with the LTE wireless technology.

The gateway 210 may perform a protocol translation operation on received MTC data flows to convert the MTC data which is in compliance with a first type protocol (e.g. Bluetooth protocol) used by the plurality of devices 110, 120 and 130 to the MTC data which is in compliance with a second type protocol (e.g. WCDMA protocol), wherein the gateway 210 may communicate with the relay node 220 through a G-R interface.

Figure 6:
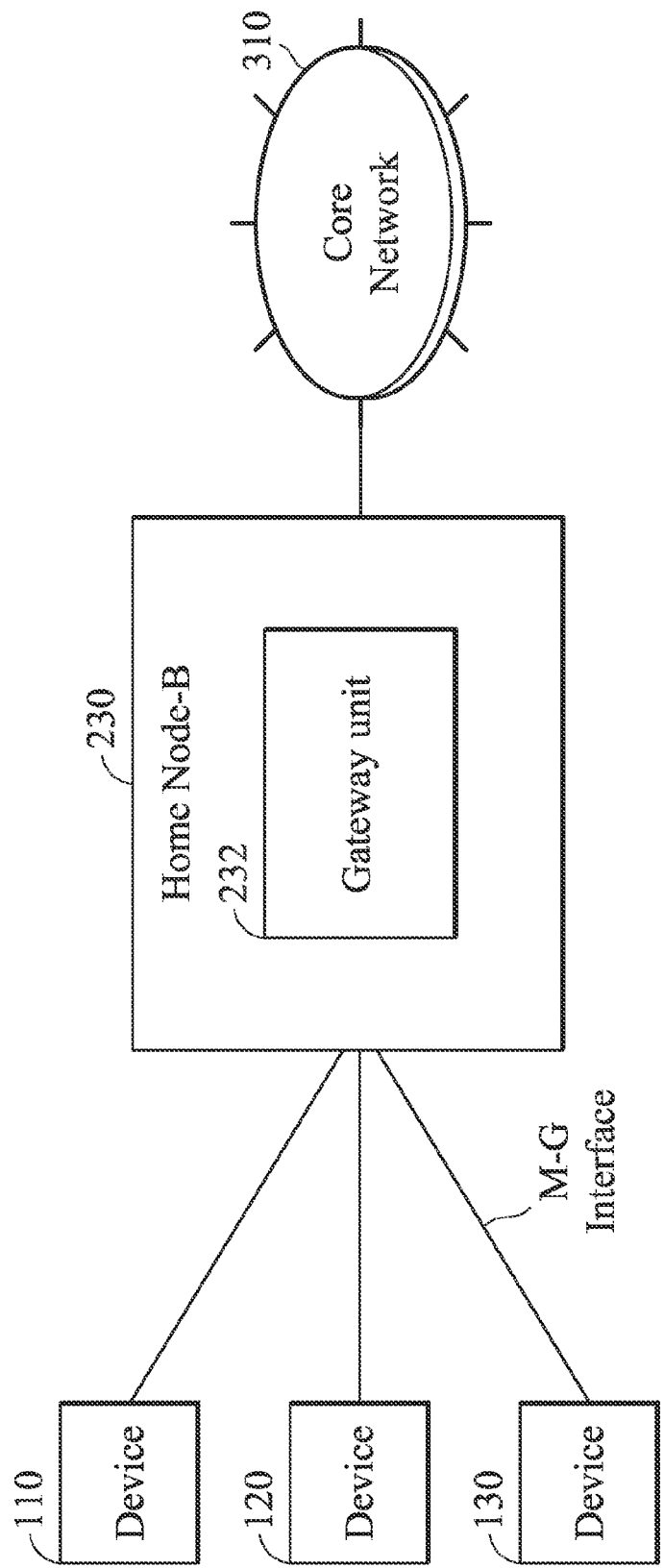
FIG. 6 is a schematic diagram illustrating another wireless communication system that includes an enhanced Home Node-B with the gateway function according to another embodiment of the invention.

In some embodiments, an enhanced Home Node-B with the gateway function that is the same as the gateway 210 is further provided. FIG. 6 is a schematic diagram illustrating another wireless communication system that includes an enhanced Home Node-B with the gateway function according to another embodiment of the invention. In this embodiment, the enhanced Home Node-B 230 may further include a gateway unit 232 and the MTC devices 110, 120 and 130 may communicate with the enhanced Home Node-B 230 through the M-G interface. The gateway unit 232 may perform a protocol translation operation on received MTC data flows to convert the MTC data which is in compliance with a first type protocol used by the plurality of devices 110, 120 and 130 (e.g. Bluetooth protocol) to MTC data which is in compliance with a second type protocol used by the enhanced Home Node-B 230 (e.g. WCDMA protocol), wherein the gateway unit 232 may communicate with the enhanced Home Node-B 230 through an internal interface. It is to be understood that, in this embodiment, the intermediate device 200 is the enhanced Home Node-B 230 and the Home Node-B 230 further receives the MTC data flows from the plurality of devices 110, 120 and 130 via the first connections over the first interface (M-G interface), generates the multiplexed data flow by performing the data multiplexing operation on the received MTC data flows, and transmits the multiplexed data flow to the core network 310 of the service network 300 through the second connection over the second interface.

Figure 7:
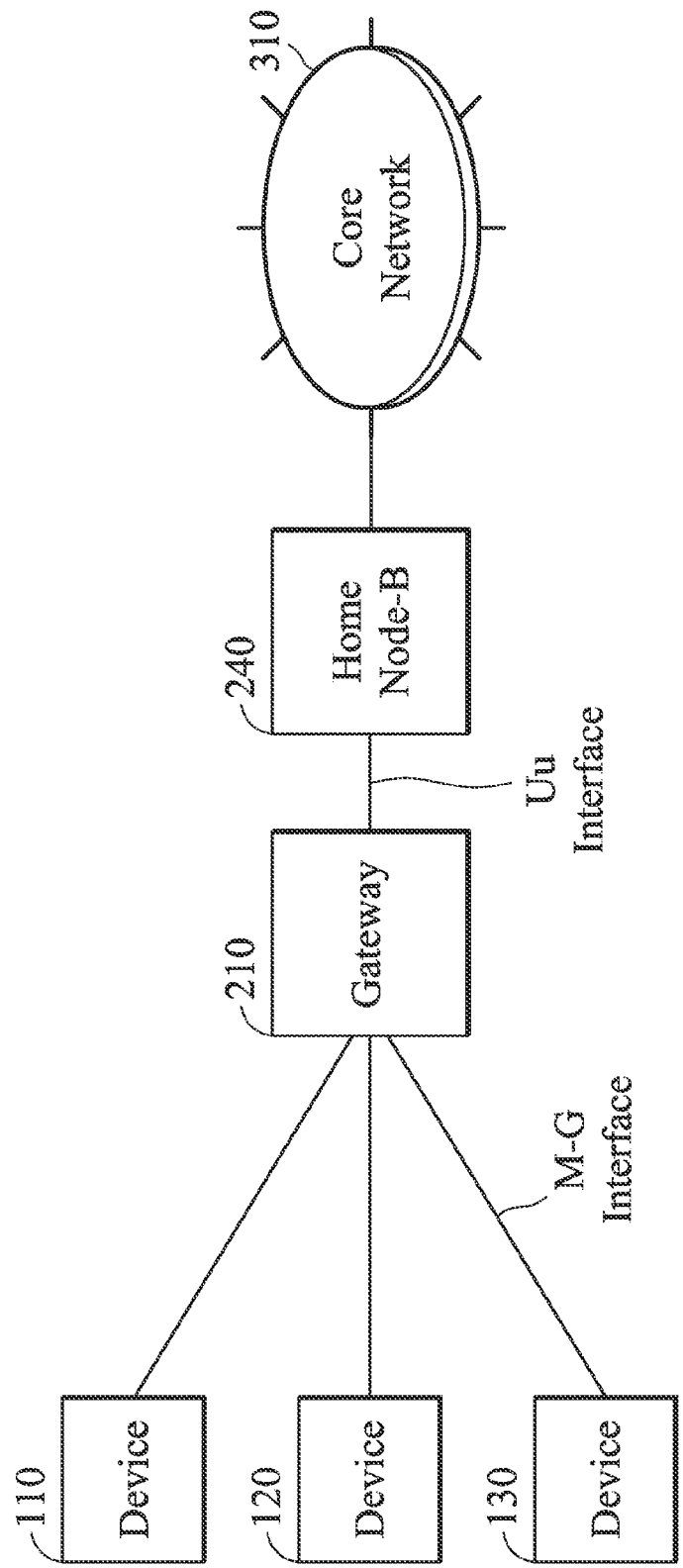
FIG. 7 is a schematic diagram illustrating another wireless communication system that includes a gateway and a Home Node-B according to another embodiment of the invention.

In some embodiments, the data processing method for processing MTC data of the invention may further perform the MTC data transmission through a gateway and a Home Node-B. FIG. 7 is a schematic diagram illustrating another wireless communication system that includes a gateway and a Home Node-B according to another embodiment of the invention. As shown in FIG. 7, in this embodiment, the gateway 210 should use the RAT that is the same as that used by the Home Node-B 240. For example, if the WCDMA access technology is utilized by the Home Node-B 240 for communications, the gateway 210 has to support the WCDMA wireless technology so as to be able to communicate with the Home Node-B 240. The gateway 210 may perform a protocol translation operation on received MTC data flows to convert the MTC data which is in compliance with a first type protocol used by the plurality of devices 110, 120 and 130 (e.g. Bluetooth protocol) to MTC data which is in compliance with a second type protocol used by the Home Node-B 240 (e.g. WCDMA protocol), wherein the gateway 210 may communicate with the Home Node-B 240 through an Uu interface. In this embodiment, the gateway 210 can receive the MTC data flows from the plurality of devices 110-130 via the first connections over the first interface and perform the data multiplexing operation on the received MTC data flows to generate a single multiplexed data flow. Thereafter, the Home Node-B 240 can receive the multiplexed data flow generated by the gateway 210 through a third interface (Uu interface) and transmit the multiplexed data flow to the core network 310 of the service network 300 through the second connection over the second interface.

Figure 8:
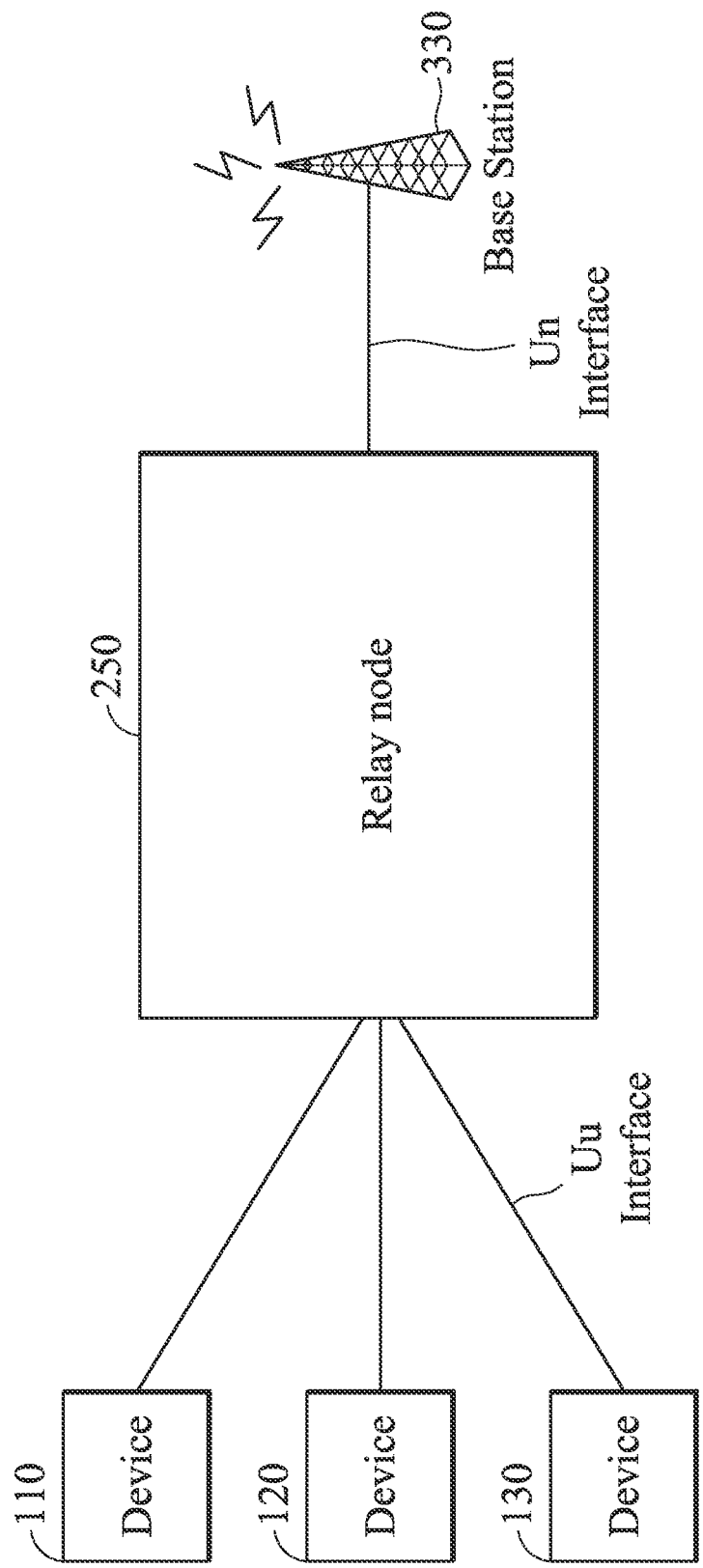
FIG. 8 is a schematic diagram illustrating another wireless communication system that includes an enhanced relay node with the gateway function according to another embodiment of the invention.

In some embodiments, an enhanced relay node architecture is further provided when the MTC gateway is not included/deployed in the wireless communication system. FIG. 8 is a schematic diagram illustrating another wireless communication system that includes an enhanced relay node with the gateway function according to another embodiment of the invention. As shown in FIG. 8, in this embodiment, the MTC devices 110, 120 and 130 may communicate with the relay node 250 directly, wherein the MTC devices 110, 120 and 130 should use the RAT that is the same as that supported by the relay node 250. For example, if the LTE wireless technology is utilized by the relay node 250 for communications, the MTC devices 110, 120 and 130 must also support the WCDMA wireless technology so as to be able to communicate with the relay node 250 directly. In addition, the enhanced relay node 250 can perform a data aggregation or data multiplexing operation for MTC related traffic data. For example, the multiple traffic data flows from different MTC devices can be multiplexed into one data flow and the multiplexed data flow can then be delivered over the interface between the relay node 250 and the base station 330. In this embodiment, the intermediate device 200 is the relay node 250 and the relay node 250 can receive the MTC data flows from the plurality of devices 110, 120 and 130 via the first connections on the aforementioned first interface, generate the multiplexed data flow by performing the data multiplexing operation on the received MTC data flows, and transmit the multiplexed data flow to the base station 330 of the service network 300 through the second connection over the aforementioned second interface.

In current relay deployments, each MTC device connected to the relay node is required to maintain one connection over the Un interface. The signaling load may be very heavy over the Un interface when the amount of MTC devices increases. Compared with existing relay deployments, with the enhanced relay node architecture of the invention, only one common connection over the Un interface is maintained for all of the MTC devices 110, 120 and 130 connected to the relay node 250. Thus, signaling overhead over the Un interface can be reduced drastically.

Similarly, in order to implement such enhanced relay node architecture, a new data multiplexing processing layer (e.g. MTC data multiplexing processing layer) is further added on to the radio interface layer of the protocol that is applied to the enhanced relay node. To be more specific, the new MTC data multiplexing processing layer, which is in charge of multiplexing the multiple MTC data flows received from all of the MTC devices into one data flow having related signaling and traffic data, may be added on to the top of the RRC layer (as shown in FIG. 3). For example, the MTC data multiplexing processing layer may respectively provide a responsive mark for each MTC data flow and then multiplex the multiple MTC data flows with the corresponding flags into one data flow having related signaling and traffic data, but the invention is not limited thereto.

In one embodiment, an enhanced Home Node-B architecture is further provided when the MTC gateway is not included/deployed in the wireless communication system. FIG. 9 is a schematic diagram illustrating another wireless communication system that includes an enhanced Home Node-B with the gateway function according to another embodiment of the invention. In this embodiment, the MTC devices 110, 120 and 130 may communicate with a Home Node-B 260 through the interface supported by the Home Node-B 260. Similarly, the MTC devices 110, 120 and 130 should use the RAT that is the same as that supported by the Home Node-B 260. For example, if the Bluetooth wireless technology is utilized by the Home Node-B 260 for communications, the MTC devices 110, 120 and 130 must also support the Bluetooth wireless technology so as to be able to communicate with the Home Node-B 260. The enhanced Home Node-B 260 can perform a data aggregation or data multiplexing operation for MTC related traffic data and thus a new data multiplexing processing layer (e.g. MTC data multiplexing processing layer) is further added on to the radio interface layer of the protocol that is applied to the enhanced Home Node-B 260, such as added on to the top of the RRC layer, to multiplex the multiple MTC data flows received from all of the MTC devices into one data flow. In this embodiment, the intermediate device 200 is the Home Node-B 260 and the Home Node-B 260 can receive the MTC data flows from the plurality of devices 110, 120 and 130 via the first connections on the aforementioned first interface, generate the multiplexed data flow by performing the data multiplexing operation on the received MTC data flows, and transmit the multiplexed data flow to the core network 310 of the service network 300 through the second connection over the aforementioned second interface.

Therefore, according to the wireless communication systems and related data processing methods for processing MTC data of the invention, various system architectures for MTC data transmission can be provided through the MTC gateway and/or the relay node and/or the Home Node-B with data multiplexing processing capability to efficiently reduce the signaling overhead between the MTC devices and the relay node. Moreover, with the wireless communication systems and related data processing methods for processing MTC data of the invention, the data multiplexing processing capability can further be integrated into the relay node or the Home Node-B such that the relay node or the Home Node-B can multiplex the multiple MTC data flows received from all of the MTC devices into one single data flow having related signaling and traffic data.

Wireless communication systems and data processing methods for processing MTC data thereof, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the invention shall be defined and protected by the following claims and their equivalents.

What is claimed is:

1. A data processing method for a wireless communication system with a plurality of terminals, an intermediate device and a service network, the method comprising:
    sending a plurality of machine type communication data flows from the plurality of terminals to a first interface of the intermediate device;
    performing a data multiplexing operation by the intermediate device on the plurality of machine type communication data flows to generate a multiplexed data flow; and
    receiving the multiplexed data flow by the service network, wherein the intermediate device comprises a gateway combined with one of the following or the combination thereof: a relay node and a home Node-B, wherein the data multiplexing operation is performed by a data multiplexing layer, the data multiplexing layer being integrated in the one of the following or the combination thereof: the relay node and the home Node-B, wherein the data multiplexing operation comprises a protocol translation of the machine type communication data flows from a first radio access technology to a second radio access technology, and wherein the converted machine type communication data flows are output via a second interface of the intermediate device.

2. The data processing method of claim 1, wherein the data multiplexing operation is performed by a data multiplexing layer, the data multiplexing layer is integrated in one of the following or the combination thereof: the relay node and the home Node-B.

3. The data processing method of claim 1, wherein the data multiplexing operation comprising:
    providing a plurality of flags corresponding to the plurality of machine type communication data flows; and
    integrating and multiplexing the plurality of machine type communication data flows with the plurality of flags into the multiplexed data flow.

4. The data processing method of claim 1, wherein the intermediate device further comprises a third interface, wherein the third interface is one of the following or the combination thereof: a Gateway-Relay node interface and a Uu interface.

5. The data processing method of claim 1, wherein
    the plurality of terminals communicating with the intermediate device using the first radio access technology via a plurality of first connections; and
    the intermediate device communicating with the service network using the second radio access technology via a second connection.

6. The data processing method of claim 5, wherein:
    the first radio access technology is a short range communication related radio access technology; and
    the second radio access technology is a cellular service network related radio access technology.

7. The data processing method of claim 1, wherein the plurality of terminals are machine type communications terminals.

8. A wireless communication system, comprising:
    a plurality of terminals, for sending a plurality of machine type communication data flows;
    an intermediate device, coupled to the plurality of devices, for receiving the plurality of machine type communication data flows via a first interface, performing a data multiplexing operation on the plurality of machine type communication data flows to generate a multiplexed data flow; and
    a service network coupled to the intermediate device for receiving the multiplexed data flow,
    wherein the intermediate device comprises a gateway combined with one of the following or the combination thereof: a relay node and a home Node-B, wherein the data multiplexing operation is performed by a data multiplexing layer, the data multiplexing layer being integrated in the one of the following or the combination thereof: the relay node and the home Node-B, wherein the data multiplexing operation comprises a protocol translation of the machine type communication data flows from a first radio access technology to a second radio access technology, and wherein the converted machine type communication data flows are output via a second interface of the intermediate device.

9. The wireless communication system of claim 8, further comprising:
    a data multiplexing layer, for performing the data multiplexing operation, the data multiplexing layer is integrated in one of the following or the combination thereof: the relay node and the home Node-B.

10. The wireless communication system of claim 8, wherein the data multiplexing operation comprising:
    providing a plurality of flags corresponding to the plurality of machine type communication data flows; and
    integrating and multiplexing the plurality of machine type communication data flows with the plurality of flags into the multiplexed data flow.

11. The wireless communication system of claim 8, wherein the intermediate device further comprises a third interface, wherein the third interface is one of the following or the combination thereof: a Gateway-Relay node interface and a Uu interface.

12. The wireless communication system of claim 8, wherein:
the plurality of terminals communicating with the intermediate device using the first radio access technology via a plurality of first connections; and
the intermediate device communicating with the service network using the second radio access technology via a second connection.

13. The wireless communication system of claim 12, wherein:
the first radio access technology is a short range communication related radio access technology; and
the second radio access technology is a cellular service network related radio access technology.

14. The wireless communication system of claim 8, wherein the plurality of terminals are machine type communications terminals.

15. A data processing apparatus for performing data transmission in a wireless communication system, the data processing apparatus comprising:
a receiving module, for receiving a first data flows via a first interface, wherein the first data flows comprising a plurality of machine type communications data flows;
a data multiplexing module, for performing a data multiplexing operation on the plurality of machine type communication data flows received by the receiving module to generate a multiplexed data flow;
a transmitting module, for transmitting a second data flows, wherein the second data flows comprising the multiplexed data flow; and
a gateway combined with one of the following or the combination thereof: a relay node and a home Node-B, wherein the data multiplexing operation is performed by a data multiplexing layer, the data multiplexing layer being integrated in the one of the following or the combination thereof: the relay node and the home Node-B, wherein the data multiplexing operation comprises a protocol translation of the machine type communication data flows from a first radio access technology to a second radio access technology, and wherein the converted machine type communication data flows are output via a second interface.

16. The data processing apparatus of claim 15, wherein the data multiplexing operation performed by the data multiplexing processing module comprising:
providing a plurality of flags corresponding to the plurality of machine type communication data flows; and
integrating and multiplexing the plurality of machine type communication data flows with the plurality of flags into the multiplexed data flow.

17. The data processing apparatus of claim 15, wherein the data processing apparatus further comprises a third interface, wherein the third interface is one of the following or the combination thereof: a Gateway-Relay node interface and a Uu interface.

18. The data processing apparatus of claim 15, wherein:
the receiving module is coupled with a plurality of terminals, wherein the plurality of terminals are communicated with the receiving module using the first radio access technology via a plurality of first connections; and
the transmitting module is coupled with a service network, wherein the transmitting module is communicated with the service network using a second radio access technology via a second connection.

19. The data processing apparatus of claim 18, wherein:
the first radio access technology is a short range communication related radio access technology; and
the second radio access technology is a cellular service network related radio access technology.

20. The data processing apparatus of claim 18, wherein the plurality of terminals are machine type communications terminals.

* * * * *